(12) United States Patent
Anantha-Raju et al.

(10) Patent No.: US 7,580,423 B2
(45) Date of Patent: Aug. 25, 2009

(54) INTEGRATED MESSAGE PUBLISHER AND SUBSCRIBER SYSTEM IN MULTIPLE TECHNOLOGY FACILITIES

(75) Inventors: Prasanna K. Anantha-Raju, Hillsboro, OR (US); Aravind Doss, Beaverton, OR (US); Chandra Mouli, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 636 days.

(21) Appl. No.: 11/240,751

(22) Filed: Sep. 30, 2005

(65) Prior Publication Data

US 2007/0076749 A1 Apr. 5, 2007

(51) Int. Cl.
*H04J 3/16* (2006.01)
(52) U.S. Cl. ..................................................... 370/466
(58) Field of Classification Search ........................ None
See application file for complete search history.

(56) References Cited

U.S. PATENT DOCUMENTS

| | | | |
|---|---|---|---|
| 6,643,652 B2* | 11/2003 | Helgeson et al. | 707/10 |
| 7,058,082 B1* | 6/2006 | Bhat et al. | 370/466 |
| 7,213,061 B1* | 5/2007 | Hite et al. | 709/223 |
| 7,216,181 B1* | 5/2007 | Jannu et al. | 709/246 |
| 7,320,017 B1* | 1/2008 | Kurapati et al. | 709/202 |
| 2003/0144903 A1* | 7/2003 | Brechner et al. | 705/14 |
| 2003/0208539 A1* | 11/2003 | Gildenblat et al. | 709/205 |
| 2008/0147661 A1* | 6/2008 | Carden | 709/205 |

* cited by examiner

*Primary Examiner*—Anh-Vu H Ly
(74) *Attorney, Agent, or Firm*—Blakely, Sokoloff, Taylor & Zafman LLP

(57) ABSTRACT

An integrated system for publishers and subscribers to messages in a multiple technology facility is described. In one embodiment the system performs operations such as receiving a message from a publisher, the message being formatted according to a first technology, converting the received message to a generic format, converting the generic format message to a format for a particular subscriber, and conveying the subscriber formatted message to the subscriber.

14 Claims, 3 Drawing Sheets

INTEGRATED MESSAGE PUBLISHER AND SUBSCRIBER SYSTEM IN MULTIPLE TECHNOLOGY FACILITIES

FIELD

The present description relates to factory or production automation and, in particular, to communicating messages from different tools across different technologies.

RELATED ART

Many modern manufacturing facilities use a variety of different types of tools and equipment to accomplish different tasks on the factory floor and in back and front end operations. Special equipment may be used for material handling, for inventory and tracking, for process management and for applying the manufacturing processes. This equipment will typically all operate using different software and control system, different communication protocols and different user interfaces.

Managing a complex manufacturing facility may require that much of the equipment be monitored and tracked and that events for a particular piece of equipment be logged. If a pallet or case of material is moved, then that may be noted in a log to track the location of the inventory. If a process is applied to some material, then that may be logged to track the production process. Some events, such as equipment outages, failures, maintenance cycles and the like may be logged but they may also be alerted to staff responsible for attending to the event.

In some facilities, some of the equipment may use inter-technology adapters to convert messages from one technology into another technology. Such inter-technology adapters only work, however, for the technology that includes the adapters. There is at present no system that works across different technologies and platforms for receiving events from the equipment and sending those alerts to staff. There are also significant limitations in categorizing messages based on topic fields. In single and inter-technology adapter systems, topic fields are only used to identify a message and no relevance or meaning is given to any particular fields in a message. To cross technologies and to associate meaning with messages, a unique system is created from scratch for each particular production tool.

In microelectronic manufacturing, specialized equipment becomes increasingly important. Currently, fabrication facilities are preparing for the use of round wafers that are 300 mm (12 inches) in diameter and that are shipped and handled in cases of 25 wafers. The size and weight of such large wafers requires a new generation of specialized handling equipment. The new equipment must allow for remote operation for the fabrication tools and processing tools in order to keep the size of the factory within reasonable limits. Remote operation may require that events in the factory on different factory components be alerted or exposed to different control terminals and operators. The events may even need to be sent outside of the factory to accommodate remote management or operations tools that might not be available to process engineers within the factory.

At the same time, to increase factory productivity, events and alerts must be provided to the appropriate operator, technician, or engineer quickly. This allows for quick decision-making and decreases equipment down-time. All of these requirements are made difficult, due to the different technologies and vendors involved in providing the complete set of automated equipment. Events from different types of machines will be generated in different technologies that cannot communicate with each other.

BRIEF DESCRIPTION OF THE DRAWINGS

Embodiments of the present invention will be understood more fully from the detailed description given below and from the accompanying drawings of various embodiments of the invention. The drawings, however, should not be taken to be limiting, but are for explanation and understanding only.

DETAILED DESCRIPTION

Embodiments of the present invention allow for the co-existence of mixed technologies for publishers of events and alerts and for subscribers to those events and alerts. A generic adapter from any technology to any other technology is used. The publishers and subscribers may, accordingly, be configured independent of the particular technology involved with a particular tool. The generic adapters may provide inter-technology message conversion, message channel control and quality of service adjustments.

Standardization across technologies allows messages to be categorized based on a single set of topic fields. Topic fields may be used that have some relevance in a particular factory environment. As a result, messages of the same type may be grouped and processed similarly across different technologies. Quality of Service specifications may also be attached to messages. These specifications may be changed dynamically at each message level based on the current environment needs and without having to redesign or restart an application. There is no theoretical limit to the extensibility possible for the system and the system may be extended without interrupting ongoing processes. Message channels may be dynamically added or removed or scaled out without any interruption to the current message flow.

Figure 1:
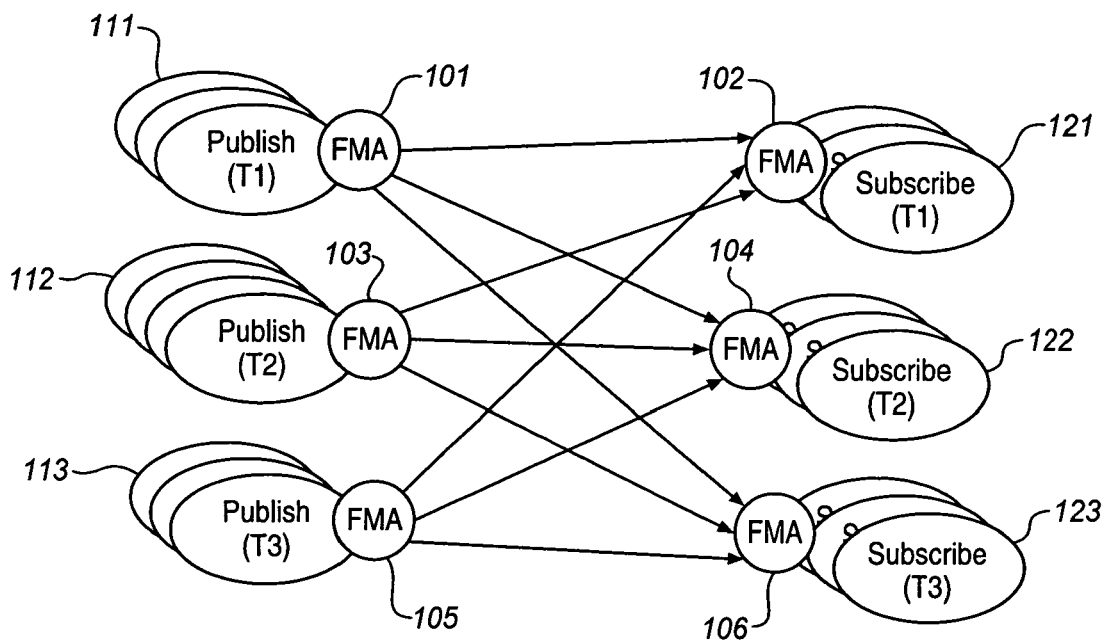
FIG. 1 is a block diagram of a factory production environment in which publishers and subscribers using different technologies communicate through a factory message adapter according to an embodiment of the invention.

FIG. 1 shows a generalized block diagram of factory equipment. In FIG. 1, there are a large number of different publishers 111, 112, 113. The publishers are the source of a message or event. The publisher may be a piece of hardware or an application and the message is typically asynchronous. However, the nature and structure of the message may depend on the technology of the publisher. The message may be in any of a variety of different forms and relate to many different topics. In many cases, a message contains information about an activity that happened at the publisher or at equipment associated with or attached to the publisher. The publishers of FIG. 1 have been collected into groups based on technologies. In FIG. 1, there are three technology groups designated as T1 111, T2 112, and T3 113 for simplicity. In a typical factory environment there are likely to be many more different technologies present.

Messages are conveyed to subscribers. A subscriber may be considered as a destination or an application that is to receive a message or event from a publisher. FIG. 1 shows subscribers in three groups similar to the publisher groups.

The first group 121 uses technology T1. The second group 122 uses technology T2, and the third group 123 uses technology T3. In a conventional situation, messages can be received by subscribers that can interpret the technology of the publisher. So the subscribers of the first group 121 can receive and interpret messages from the publishers of the first group 111 and so forth. While there may be some adapters available to convert messages between certain technologies (T1 to T2, for example), these may not apply across all technologies. So, for example, publishers using technology T3 may not be able to send messages to subscribers using technology T1 or T2.

In order to allow communication across different technologies that are not supported by an adapter, a generic adapter, identified as an FMA (Factory Message Adapter) 101, 102, 103, 104, 105, 106, is provided at each publisher and at each subscriber group. While FIG. 1 shows one FMA per technology group, any one publisher or subscriber may have its own FMA that is not shared with others in the same technology group. By connecting the FMAs to each other, messages may be communicated from any technology group to any other technology group through the FMAs as shown in FIG. 1 by arrows. The arrows represent message channels, i.e. a data flow between a publisher and subscriber that carries a message or event.

Each FMA provides stub implementations for each technology and sends messages independent of the technology of the publisher side. The subscribers may then use stubs specific to the subscriber technology to process these messages. This allows messages to be provided across technologies and it allows messages to be handled in a technology-independent form at an FMA.

Figure 2:
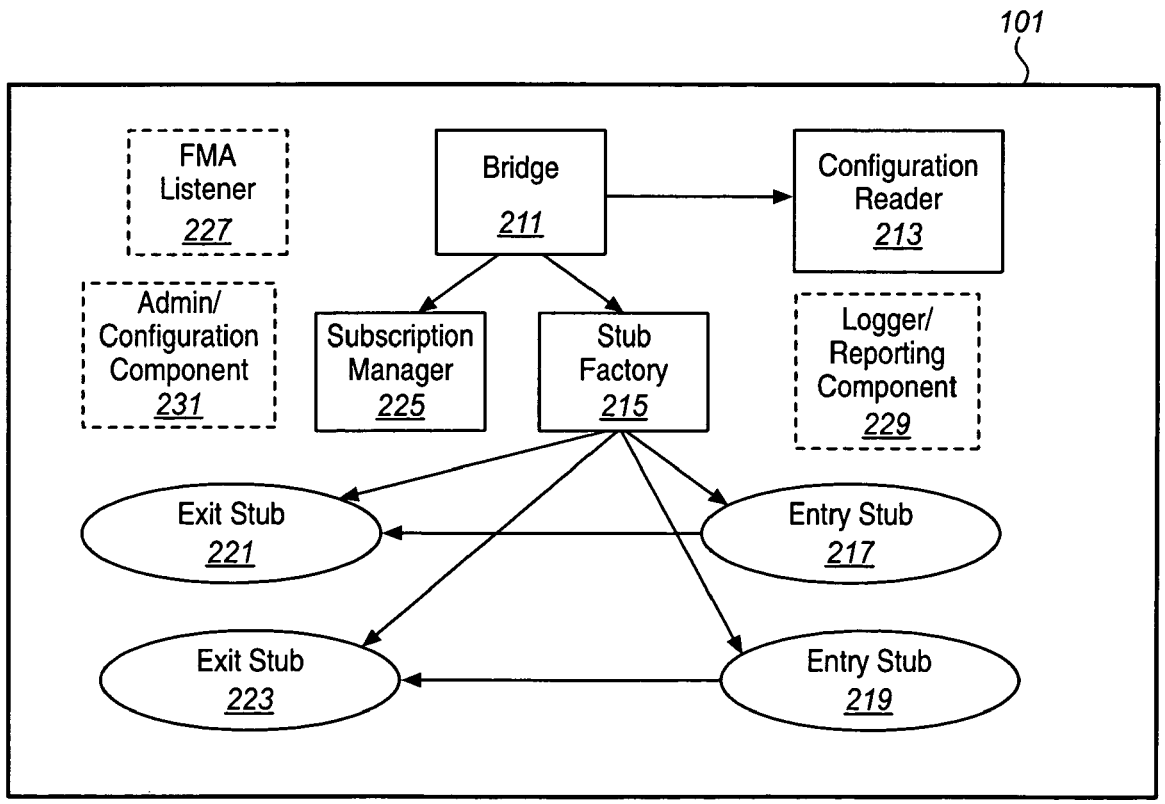
FIG. 2 is a block diagram of a factory message adapter according to another embodiment of the invention.

FIG. 2 shows an example of an FMA (Factory Message Adapter) 101 suitable for many different factory or fabrication facility applications. The FMA includes a Bridge 211 that is responsible for initializing and linking publishers and subscribers regardless of technology. The Bridge is coupled to and uses a configuration reader 213. The configuration reader reads the configuration files at startup and provides the publisher and subscriber details to the bridge. It may also maintain local configuration files that may be used to store and track details about publishers and subscribers. The configuration reader may also be used as an interface to get and to put configurations of currently existing publishers and subscribers and to initialize new publishers and subscribers.

The bridge may be used as the main startup and shut down loop of the FMA. As the system begins, the bridge may be used to set up the stubs that are expected to be used using the configuration reader and the stub factory. It may also set up any connections that may be expected for communicating messages and events from publishers to subscribers.

The bridge is coupled through a stub factory 215 to entry stubs 217, 219 linked to publisher technologies, and to exit stubs 221, 223 linked to subscriber technologies. The stub factory is responsible for creating and initializing existing stubs. The stub factory may be invoked by the bridge.

The stubs represent implementations of particular publishers and subscribers within the FMA. Each stub implements a particular technology and any details specific to the particular publisher or subscriber. For each message channel there will be an entry stub 217 and a corresponding exit stub 221 linked by the bridge. Each stub may be generated by the stub factory based on settings provided by the bridge or it may be provided by an external source, such as a system manager.

The bridge is also coupled to a subscription manager to aggregate subscriptions. Accordingly, if another subscriber is interested in the same topic as a previous subscriber with the same quality of service as the previous subscriber, then the subscription manager may make the bridge couple the new subscriber's subscription to the same channel as the previous subscriber's subscription. Multiple subscribers may be served at very little additional cost when the subscriptions are aggregated.

Additional optional components of the FMA include an FMA listener. The FMA listener may be used to monitor traffic in the environment and determine when new publishers appear or when existing publishers start publishing on a new topic across the environment. A new topic may be considered as a new unique identifier for a group of messages. Since, in one embodiment, the stubs parse messages by topic, as described in more detail below, a new topic for a new or an existing subscriber may involve changes to the appropriate stub. The listener may connect with the stub factory (connection not shown) and, when appropriate, new stubs may be generated and linked to a new or existing message channel.

The FMA also includes a logger/reporting component 229. This allows any events within the FMA to be logged and reported to a system manager or administrator. The logger/reporting component may also be used to log particular messages and events received from a publisher. Such a log may allow for a maintenance history of a particular tool to be tracked. For materials handling equipment, the logger/reporting component may also be coupled to an inventory tracking system to report inventory changes within the factory. Reports may be generated to alert the system manager or administrator of particular published events.

Since the logger/reporting component is co-located with the FMA it may also accumulate events from one or more publishers and apply the events to timers and other algorithms. This may allow it to generate a report, for example, that a particular tool or group of tools has been shut down for more than four hours in the last two weeks. In this way, the logger/reporting component can monitor the factory in a way that goes beyond the responsibility of any one subscriber. The logger/reporting component may also be used to log events that occur with FMA including hardware, software and communication failures. These may be reported to management and support personnel.

The FMA also may include an administration/configuration component. This may include an external interface through a local or wide area network or a local user interface. The administration/configuration component allows for all of the configuration options to be set. It may also allow stubs to be added or removed, new capabilities to be added to the stub factory and it may allow access to the logger/reporting component to view logs, receive reports and modify settings.

Stubs are created using technology-specific parameters that are set up for each particular stub. In this way, the entry stubs may take a technology-specific message, and convert it into a technology-independent or generic implementation of the published message. Similarly, the exit stubs may take a technology independent or generic implementation of a message and turn it into a message in the technology of a particular subscriber. In one embodiment, XML (Extensible Markup Language) notation is used as a technology-independent format. The topic and stub specification and any other desired information may be included in a generic XML template as shown below.

In one embodiment, the generic XML template may be configured as shown below. The generic message format may be modified to accommodate a wide variety of different environments. More or fewer fields than those shown below may be used depending on the particular application.

```
<Topic>Field1.Field2.Field3.Field4</Topic>
<Protocol>Technology1</Protocol>
<ProtocolDetails>
    </SpecificToTechnology>
</ProtocolDetails>
```

The Topic field may be structured to conform to any particular format. In this example, three to five different information elements, Field1, Field2, etc., separated by periods, are used. One set of topics may be written as Fab.Source.Category.Env.<Area>.<Location>. Area, and Location may be optional fields, and default values may be used if there is no information to provide in any one or more fields. In this example Fab Source refers to the factory from which the message is generated. Category refers to the type of the message, Env refers to the environment in the factory. Area refers to the sub area within the factory. Location refers to the physical bay or location of the tool that generated the message. The generic message format also includes a Protocol field and a Protocol Details field. These fields spell out how information is to be converted to or from a particular technology to the generic format.

To further illustrate the generic template, an example generic publisher message in XML is shown below. In this format, "FAB1.MES.Prod.LogEvent" identifies the topic of the message as concerning facility FAB1 and the MES (Manufacturing execution system) within FAB1. This message accordingly relates to an event logged on an entity from the MES at facility FAB1. "FAB300" identifies the protocol or technology used by the source of the message. "FAB300.LogEvent" and "Guaranteed" identify the particular protocol details used for the message and identifies the type of the message. This message is used for setup and converting. The published information to be sent to the subscriber, for example a status or condition change or alert, may be added to this message or carried in a separate message with an appropriate identification of the publisher.

```
<Publish>
<Topic>FAB1.MES.Prod.LogEvent</Topic>
<PublisherProtocol>FAB300</PublisherProtocol>
<PublisherProtocolDetails>
    <PublishSubject>FAB300.LogEvent </PublishSubject>
    <Type>Guaranteed</Type>
</PublisherProtocolDetails>
</Publish>
```

A corresponding example subscriber message in XML format is provided below. In this format, the fields are similar except that the protocol details will be different which will invoke a different protocol for the subscription than the publisher details of the example publisher message above. As with the example above, this message may be used for setup, subscription tracking and start up. The alert or status change may be added to this message or sent separately.

```
<Subscription>
<Topic>FAB1.*.Prod.LogEvent</Topic>
<SubscriberProtocol>RV</SubscriberProtocol>
<SubscriberProtocolDetails>
    <SubscriberSubject>FAB1.*.Prod.</SubscriberSubject>
    <Type>RVCM</Type>
```

```
</SubscriberProtocolDetails>
</Subscription>
```

In use, the FMA 101, 103, 105 on a publisher side may have one or more publisher entry 217 stubs. Similarly a FMA 102, 104, 106 on the subscriber side will have one or more subscriber exit stubs 223. The publisher entry stub may receive data from a publisher application for which the entry stub is configured and then call the appropriate publisher exit stub. The entry stub is responsible for converting the messages from a technology specific data format to a generic XML format. Accordingly, as shown in FIG. 1 there is a different entry stub for each technology. The exit stub then converts the message from the generic XML format to a technology specific data format. As can also be seen in FIG. 1, there may be a different exit stub for each technology.

The conversion from a technology-specific format to the generic format may be done in different ways depending on the particular technology. Existing approaches may be applied for many existing technologies. The number and type of fields to maintain in the generic format may be adapted to suit a particular application. The generic XML template provided above is intended only as an example.

The publisher entry stub receives the data from the publisher and sends it out on the network in a generic format, such as XML as described above and configured in a specific protocol, such as MSMQ (Microsoft Message Queuing) or RV (Rendezvous from TIBCO).

The publisher entry stub may also call the appropriate subscriber exit stub (COM call). The called subscriber exit stub receives data from the from the network in the generic format and sends it out in the technology-specific format to the actual subscriber application. Subscriptions to messages may be handled by the subscriber technology in the same way as they are handled in existing systems.

Using the stubs, message flow may automatically be stopped and started based on the status of subscribers and publishers. Similarly message channels may be automatically reconfigured based on messages from publishers and subscribers. Messages may also be selected by a subscriber with great specificity. The only limit on message selection is the content of the message. In addition, new technologies, and protocols may be accommodated by simply adding new stubs.

Figure 3:
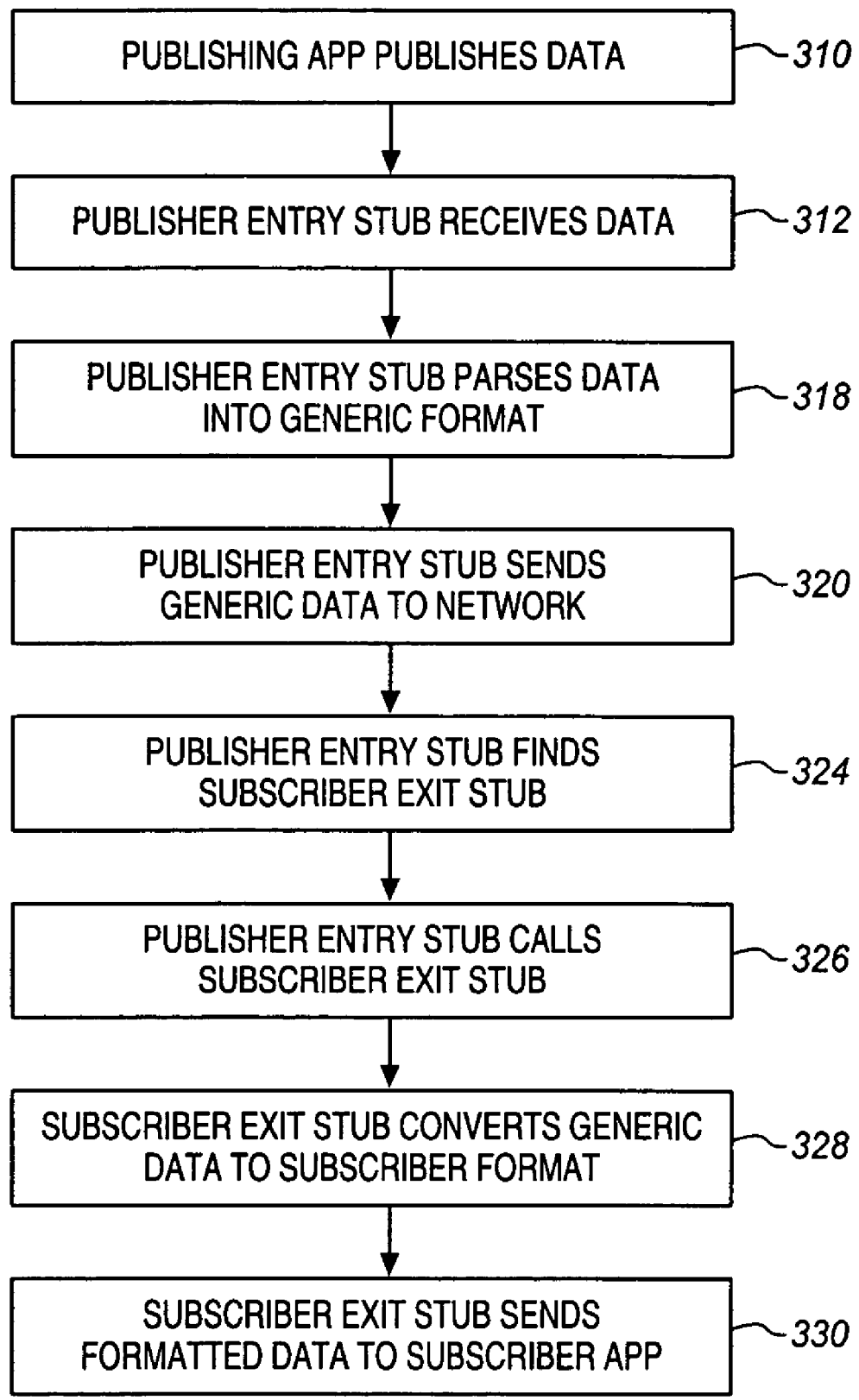
FIG. 3 is a process flow diagram of communicating messages using a factory message adapter according to an embodiment of the invention.

A messaging process such as that described above, may be better understood by reference to the process flow diagram of FIG. 3. In FIG. 3, a message transaction begins when a publishing application publishes data at block 310. This will typically correspond to an alert or message as mentioned above. At block 312, the publisher entry stub receives the data. The same publisher entry stub may be used for every message from a single technology or unique publisher entry stubs may be used. The publisher entry stub parses the data into a generic format at block 318. At block 320, the publisher entry stub then sends the generic data to the network.

On the network, any subscriber interested in receiving the data may obtain access to it, subject to any security controls. At block 324, the publisher entry stub finds the subscriber exit stub for the particular subscriber. This may be done based on the source of the message using the topic fields, discussed above, for example. The publisher entry stub then calls the subscriber exit stub at block 326. The subscribers get the messages based on the topic that they are listening on (See FMA Listener 227). The bridge 211 during setup may map all the exit stubs that the messages need in order to be delivered to the corresponding entry stub.

The subscriber exit stub converts the generic data to the format required by the subscriber for which it is configured at block 328. Then at block 330, the subscriber exit stub sends the formatted data to the subscriber application.

Figure 4:
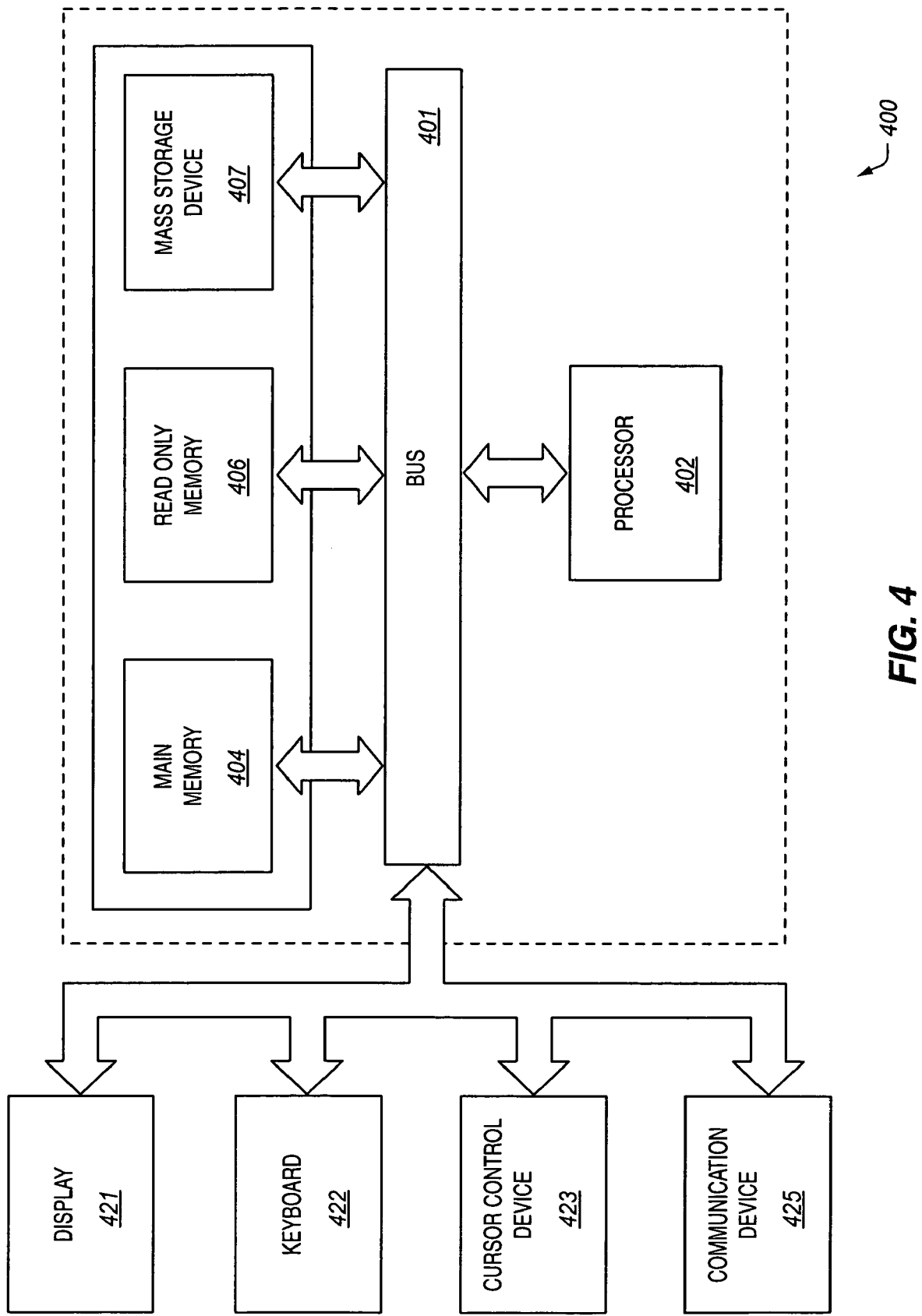
FIG. 4 is an example of a computer system capable of performing aspects of the present invention.

FIG. 4 shows an example of a general purpose computer suitable for housing a FMA such as the one shown in FIG. 2. The computer system 400 includes a bus or other communication means 401 for communicating information, and a processing means such as a microprocessor 402 coupled with the bus 401 for processing information. The computer system 400 further includes a main memory 404, such as a random access memory (RAM) or other dynamic data storage device, coupled to the bus 401 for storing information and instructions to be executed by the processor 402. The main memory also may be used for storing temporary variables or other intermediate information during execution of instructions by the processor.

The computer system may also include a nonvolatile memory 406, such as a read only memory (ROM) or other static data storage device coupled to the bus for storing static information and instructions for the processor. A mass memory 407 such as a magnetic disk or optical disk and its corresponding drive may also be coupled to the bus of the computer system for storing information and instructions.

The computer system may also be coupled via the bus to a display device or monitor 421, such as a Liquid Crystal Display (LCD), for displaying information to a user. For example, graphical and textual indications of installation status, operations status and other information may be presented to the user on the display device. Typically, an alphanumeric input device 422, such as a keyboard with alphanumeric, function and other keys, may be coupled to the bus for communicating information and command selections to the processor. A cursor control input device 423, such as a mouse, a trackball, or cursor direction keys may be coupled to the bus for communicating direction information and command selections to the processor and to control cursor movement on the display 421.

A communication device 425 is also coupled to the bus 401. The communication device 425 may include a modem, a network interface card, or other well known interface devices, such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example.

It is to be appreciated that a lesser or more equipped computer system than the example described above may be preferred for certain implementations. Therefore, the configuration of the exemplary computer system 400 will vary from implementation to implementation depending upon numerous factors, such as price constraints, performance requirements, technological improvements, or other circumstances.

A lesser or more equipped subscriber, publisher, message adapter, bridge or subscription system, process flow, or computer system than the examples described above may be preferred for certain implementations. Therefore, the configuration and ordering of the examples provided above may vary from implementation to implementation depending upon numerous factors, such as the hardware application, price constraints, performance requirements, technological improvements, or other circumstances. Embodiments of the present invention may also be adapted to other types of environments and subscription approaches than the examples described herein.

Embodiments of the present invention may be provided as a computer program product which may include a machine-readable medium having stored thereon instructions which may be used to program a general purpose computer, mode distribution logic, memory controller or other electronic devices to perform a process. The machine-readable medium may include, but is not limited to, floppy diskettes, optical disks, CD-ROMs, and magneto-optical disks, ROMs, RAMs, EPROMs, EEPROMs, magnet or optical cards, flash memory, or other types of media or machine-readable medium suitable for storing electronic instructions.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known circuits, structures and techniques have not been shown in detail to avoid obscuring the understanding of this description.

While the embodiments of the invention have been described in terms of several examples, those skilled in the art may recognize that the invention is not limited to the embodiments described, but may be practiced with modification and alteration within the spirit and scope of the appended claims. The description is thus to be regarded as illustrative instead of limiting.

What is claimed is:

1. A method comprising
receiving a message from a publisher at an entry stub, the message being formatted according to a first technology;
converting the received message to a generic format;
converting the generic format message to a format of a second technology for a particular subscriber at an exit stub through a bridge linking the entry stub to the exit stub;
conveying the subscriber formatted message to the subscriber;
maintaining subscriptions to messages in the second technology and correlating the messages to the exit stub;
finding and calling the exit stub by the entry stub; and
generating new stubs in a stub factory based on settings provided by the bridge.

2. The method of claim 1, further comprising selecting the message for application of the particular subscriber before converting the message to the subscriber format.

3. The method of claim 1, wherein converting the received message comprises converting the received message by the entry stub.

4. The method of claim 1, wherein converting the message to a generic format comprises generating a topic field for the message, the topic field identifying the source of the message and the location of the source of the message.

5. The method of claim 4, wherein converting the message to a generic format comprises generating a protocol field for the message, the protocol field identifying a protocol, used by the first technology.

6. A computer-readable medium including executable instructions that when executed by a computer cause the computer to perform operations comprising;
receiving a message from a publisher at an entry stub, the message being formatted according to a first technology;
converting the received message to a generic format;

converting the generic format message to a format of a second technology for a particular subscriber at an exit stub through a bridge linking the entry stub to the exit stub;

conveying the subscriber formatted message to the subscriber;

maintaining subscriptions to messages in the second technology and correlating the messages to the exit stub;

finding and calling the exit stub by the entry stub;

generating new stubs in a stub factory based on settings provided by the bridge.

7. The computer-readable medium of claim 6, further comprising instructions, which when executed by the computer, cause the computer to perform further operations comprising selecting the message for application of the particular subscriber before converting the message to the subscriber format.

8. The computer-readable medium of claim 7, wherein converting the received message comprises converting the received message by the entry stub.

9. The computer-readable medium of claim 8, wherein converting the message to a generic format comprises generating a protocol field for the message, the protocol field identifying a protocol, used by the first technology.

10. The computer-readable medium of claim 9, further comprising finding an exit stub for the received message.

11. An apparatus comprising:

an entry stub to receive a message formatted according to a first technology and to convert it into a generic format;

an exit stub to receive the message in the generic format and convert it into a second technology;

a bridge to link the entry stub to the exit stub;

a subscription manager to maintain subscriptions to messages in the second technology and correlate the messages to the exit stub, and a stub factory to generate new stubs based on settings provided by the bridge;

wherein the entry stub is further to find and call the exit stub.

12. The apparatus of claim 11, further comprising a subscription manager to aggregate subscriptions.

13. The apparatus of claim 11, further comprising a listener to monitor message traffic and determine when new publishers appear, the listener being connected to the stub factory so that a new stub may be generate for a new publisher.

14. The apparatus of claim 11, further comprising a configuration reader to read configuration files at startup and provide publisher and subscriber details to the bridge.

* * * * *

UNITED STATES PATENT AND TRADEMARK OFFICE
CERTIFICATE OF CORRECTION

PATENT NO. : 7,580,423 B2
APPLICATION NO. : 11/240751
DATED : August 25, 2009
INVENTOR(S) : Anantha-Raju et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 929 days.

Signed and Sealed this

Fourteenth Day of September, 2010

David J. Kappos
*Director of the United States Patent and Trademark Office*